United States Patent
Veskovic (10) Patent No.: US 8,345,400 B2
(45) Date of Patent: Jan. 1, 2013

(54) SURGE SUPPRESSION CIRCUIT FOR A LOAD CONTROL DEVICE

(75) Inventor: Dragan Veskovic, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 319 days.

(21) Appl. No.: 12/857,841

(22) Filed: Aug. 17, 2010

(65) Prior Publication Data

US 2012/0044599 A1 Feb. 23, 2012

(51) Int. Cl.
H02H 1/04 (2006.01)
(52) U.S. Cl. .......................... 361/118; 361/117
(58) Field of Classification Search ........... 361/117–120
See application file for complete search history.

(56) References Cited

U.S. PATENT DOCUMENTS

| | | |
|---|---|---|
| 4,168,514 A | 9/1979 | Howell |
| 4,210,846 A | 7/1980 | Capewell et al. |
| 4,288,833 A | 9/1981 | Howell |
| 4,350,935 A | 9/1982 | Spira et al. |
| 4,698,721 A * | 10/1987 | Warren .......................... 361/110 |
| 4,728,866 A | 3/1988 | Capewell et al. |
| 4,797,599 A | 1/1989 | Ference et al. |
| 4,912,589 A | 3/1990 | Stolarczyk |
| 5,055,742 A | 10/1991 | Jurell et al. |
| 5,144,205 A | 9/1992 | Motto et al. |
| 5,173,643 A | 12/1992 | Sullivan et al. |
| 5,327,319 A | 7/1994 | Lee et al. |
| 5,388,021 A | 2/1995 | Stahl |
| 5,555,150 A | 9/1996 | Newman, Jr. |
| 6,781,326 B2 | 8/2004 | Stack |
| 2012/0026639 A1 * | 2/2012 | Wright et al. .................. 361/118 |

OTHER PUBLICATIONS

Partial Reverse-Engineered Schematic of Power Supply (P/N STEP-PS/1AC/24DC1.75) manufactured by Phoenix Contact Inc. and available to the public at least as early as Sep. 2009.
Phoenix Contact Inc., STEP-PS/1AC/24DC/1.75 Data Sheet, Sep. 18, 2009. 7 pages.

\* cited by examiner

*Primary Examiner* — Danny Nguyen
(74) *Attorney, Agent, or Firm* — Mark E. Rose; Philip N. Smith; Bridget L. McDonough (57) ABSTRACT

A surge suppression circuit for a load control device allows the load control device to pass hipot testing, while providing improved protection of the load control device during surge events. The load control device comprises a load control circuit and a filter circuit for preventing noise generated by the load control circuit from being provided to an AC power source. The surge suppression circuit comprises a clamping device adapted to be electrically coupled across the AC power source, and first and second spark gaps coupled across the filter circuit for limiting the magnitude of the voltage generated by inductive components of the filter circuit. The filter circuit may comprise a common-mode choke, and two series-connected capacitor having their junction connected to earth ground. Alternatively, the filter circuit may additionally comprise a differential-mode choke.

30 Claims, 5 Drawing Sheets

SURGE SUPPRESSION CIRCUIT FOR A LOAD CONTROL DEVICE

BACKGROUND OF THE INVENTION

1. Field of the Invention

The present invention relates to a surge suppression circuit for protecting an electrical load during surge events.

2. Description of the Related Art

A load control device is operable to control the amount of power delivered from an alternating-current (AC) power source to an electrical load, such as a lighting load or a motor load. Typical load control devices include, for example, dimmer switches for lighting loads, electronic ballasts for gas discharge lamps, light-emitting diodes (LED) drivers for LED light sources, and motor control devices for motor loads. Typical load control devices are designed to withstand surge events (i.e., transient spikes in voltage) that can occur on a power line as a result of inductive load switching, lightning strikes, and other transient events on the power line. Prior art load control devices have included voltage surge and voltage transient suppressors between the AC power source and the controlled electrical load to protect the electrical load from the surges and transient spikes.

In addition, typical load control devices are also designed such that the electrical insulation between the electrical circuitry and the outer enclosure (which is typically connected to earth ground) is appropriate, such that the load control devices do not provide unsafe conditions for a user. The insulation strength of a load control device may be tested using a "hipot" test in which the a large, low-frequency voltage (e.g., 2000 volts) is produced between the line voltage terminals and the outer enclosure (i.e., earth ground) and the leakage current through the insulation is measured to ensure that the leakage current does not exceed a safe magnitude.

Figure 1:
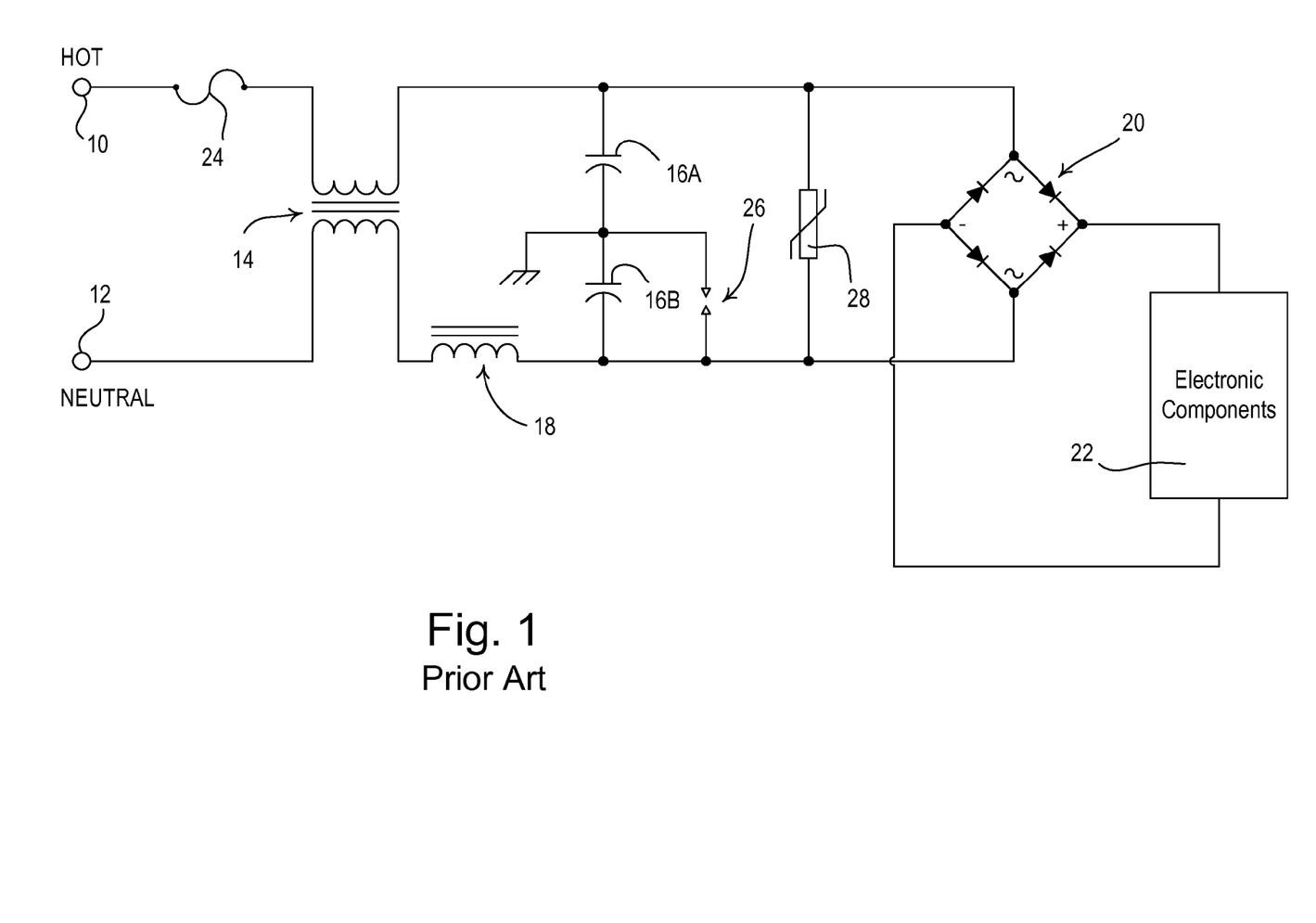
FIG. 1 is a simplified schematic diagram of a prior art surge suppression circuit.

FIG. 1 is a simplified schematic diagram of a prior art surge suppression system, which provides compliance with the ANSI standard for surge suppression. Hot and neutral power lines 10, 12 are coupled to electronic components 22 via a transformer 14, an RFI (radio-frequency interference) filter comprising capacitors 16A, 16B and magnetic core inductor 18, and bridge rectifier 20. A fuse 24 is coupled in series with the hot power line 10. A single clamping device, e.g., a metal-oxide varistor (MOV) 28, is coupled to the AC input terminals of the bridge rectifier 20 (i.e., after the RFI filter). The single MOV 28 provides protection from both differential mode (hot to earth ground) and common mode (hot and neutral to earth ground) surges. However, surge events can cause resonant ringing in the components of the RFI filter, which may greatly amplify the magnitude of the voltages applied to the electronic components 22. For example, the magnitude of the voltage across either of the capacitors 16A, 16B could ring up to approximately twice the magnitude of the surge voltage that is provided to the hot and neutral power lines 10, 12. Thus, a spark gap 26 is coupled from neutral to ground (in parallel with the capacitor 16B) to provide a controlled location for breakdown of the high voltage generated by the RFI filter. The surge suppression system of FIG. 1 is described in greater detail in U.S. Pat. No. 5,555,150, issued Sep. 10, 1996, entitled SURGE SUPPRESSION SYSTEM, the entire disclosure of which is hereby incorporated by reference.

Since the spark gap 26 is coupled from neutral to ground (in parallel with the capacitor 16B), the spark gap must be sized such that the system of FIG. 1 can pass the hipot testing, i.e., such that the spark gap does not breakdown at less than, for example, 2000 volts. Thus, the spark gap 26 negatively impacts the ability of the surge suppression system to limit the magnitude of the surge voltages applied to the electronic components 22. Therefore, there is a need for a surge suppression system that is able to pass hipot testing, while limiting the magnitude of the surge voltage applied to the electronic components 22 to even smaller levels.

SUMMARY OF THE INVENTION

According to an embodiment of the present invention, a surge suppression circuit for a load control device allows the load control device to pass hipot testing, while providing improved protection of the load control device during surge events. The load control device comprises a load control circuit and a filter circuit that has first and second connections adapted to receive an AC mains line voltage from an AC power source, and third and fourth connections adapted to be coupled to the load control circuit. The filter circuit has one or more inductive components, and is operable to prevent noise generated by the load control circuit from being provided to the AC power source. The surge suppression circuit comprises a clamping device electrically coupled between the first and second connections of the filter circuit, a first spark gap coupled between the first and third connections of the filter circuit for limiting the magnitude of the voltage generated between the first and third connections by the inductive components of the filter circuit, and a second spark gap coupled between the second and fourth connections of the filter circuit for limiting the magnitude of the voltage generated between the second and fourth connections by the inductive components of the filter circuit.

In addition, a load control system for controlling the power delivered from an AC power source to an electrical load is also described herein. The load control system comprises a load control circuit adapted to be coupled in series electrical connection between the AC power source and the electrical load for controlling the power delivered to the electrical load, and a filter circuit having first and second connections adapted to receive an AC mains line voltage from an AC power source, and third and fourth connections adapted to be coupled to the load control circuit. The filter circuit is operable to prevent noise generated by the load control circuit from being provided to the AC power source. The load control system further comprises a clamping device electrically coupled between the first and second connections of the filter circuit, a first spark gap coupled between the first and third connections of the filter circuit for limiting the magnitude of the voltage generated between the first and third connections, and a second spark gap coupled between the second and fourth connections of the filter circuit for limiting the magnitude of the voltage generated between the second and fourth connections.

According to one embodiment of the present invention, the filter circuit comprises a common-mode choke and first and second capacitors. The common-mode choke has first and second windings magnetically coupled together. The first and second windings of the common-mode choke have respective first ends adapted to be coupled to the AC power source, and respective second ends opposite the first ends. The series-combination of the first and second capacitors is electrically coupled between the second ends of the first and second windings of the common-mode choke, and the junction of the first and second capacitors adapted to be coupled to earth ground. The first spark gap is coupled between the first and second ends of the first winding of the common-mode choke, and the second spark gap is coupled between the first and second ends of the second winding of the common-mode choke.

According to another embodiment of the present invention, the filter circuit comprises a common-mode choke, a differential-mode choke, and first and second capacitors. The differential-mode choke is coupled in series with the second winding of the common-mode choke. The series combination of the differential-mode choke and the second winding of the common-mode choke has a first end and a second end opposite the first end, such that the first ends of the first winding of the common-mode choke and the series combination of the differential-mode choke and the second winding of the common-mode choke are adapted to be coupled to the AC power source. The first spark gap is coupled between the first and second ends of the first winding of the common-mode choke, and the second spark gap is coupled between the first and second ends of the series combination of the differential-mode choke and second winding of the common-mode choke.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
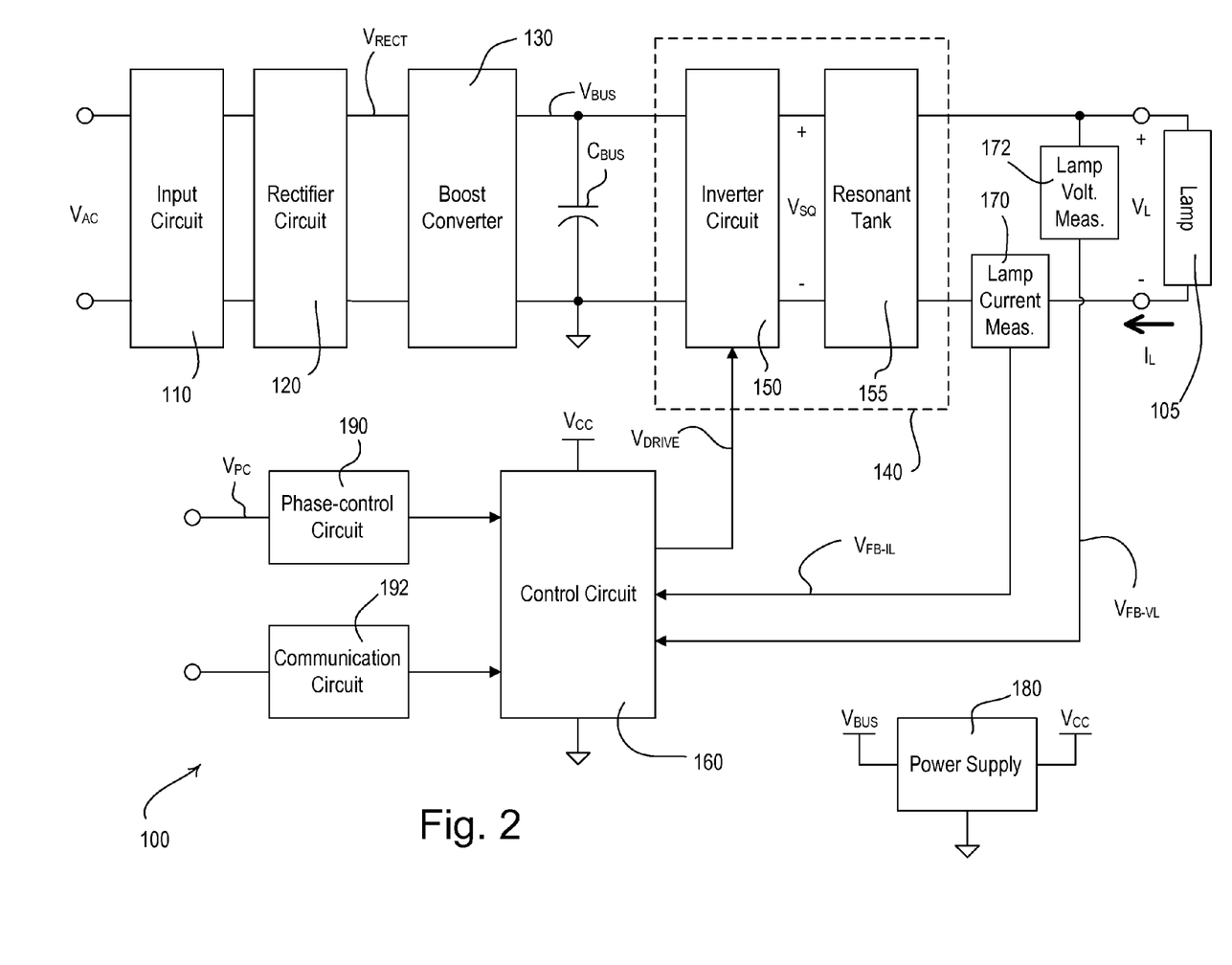
FIG. 2 is a simplified block diagram of an electronic dimming ballast according to an embodiment of the present invention.

FIG. 2 is a simplified block diagram of an electronic dimming ballast 100 according to a first embodiment of the present invention. The ballast 100 comprises a hot terminal H and a neutral terminal N that are adapted to be coupled to an alternating-current (AC) power source (not shown) for receiving an AC mains line voltage $V_{AC}$. The ballast 100 is adapted to be coupled between the AC power source and a gas discharge lamp (e.g., a fluorescent lamp 105), such that the ballast is operable to control of the amount of power delivered to the lamp and thus the intensity of the lamp. The ballast 100 comprises an input circuit 110 for minimizing the noise provided on the AC mains and for protecting the electrical circuitry of the ballast 100 during surge events as will be described detail below. The ballast 100 further comprises a rectifier circuit 120 for generating a rectified voltage $V_{RECT}$ from the AC mains line voltage $V_{AC}$, and a boost converter 130 for generating a direct-current (DC) bus voltage $V_{BUS}$ across a bus capacitor $C_{BUS}$. The DC bus voltage $V_{BUS}$ typically has a magnitude (e.g., 465 V) that is greater than the peak magnitude $V_{PK}$ of the AC mains line voltage $V_{AC}$ (e.g., 170 V). The boost converter 130 also operates as a power-factor correction (PFC) circuit for improving the power factor of the ballast 100. The ballast 100 also includes a load control circuit 140 comprising an inverter circuit 150 and a resonant tank circuit 155. The inverter circuit 150 converts the DC bus voltage $V_{BUS}$ to a high-frequency AC voltage, while the resonant tank circuit 155 couples the high-frequency AC voltage generated by the inverter circuit to filaments of the lamp 105.

The ballast 100 further comprises a control circuit 160 for controlling the intensity of the lamp 105 to a target intensity $L_{TARGET}$ between a minimum intensity $L_{MIN}$ (e.g., 1%) and a maximum intensity $L_{MAX}$ (e.g., 100%). The control circuit 160 may be implemented as a microprocessor, microcontroller, a programmable logic device (PLD), an application specific integrated circuit (ASIC), or any suitable type of controller or control circuit. The control circuit 160 is coupled to the inverter circuit 150 and provides a drive control signal $V_{DRIVE}$ to the inverter circuit for controlling the magnitude of a lamp voltage $V_L$ generated across the lamp 105 and a lamp current $I_L$ conducted through the lamp. Accordingly, the control circuit 160 is operable to turn the lamp 105 on and off and adjust (i.e., dim) the intensity of the lamp 105. The control circuit 160 receives a lamp current feedback signal $V_{FB-IL}$, which is generated by a lamp current measurement circuit 170 and is representative of the magnitude of the lamp current $I_L$. The control circuit 160 also receives a lamp voltage feedback signal $V_{FB-VL}$, which is generated by a lamp voltage measurement circuit 172 and is representative of the magnitude of the lamp voltage $I_L$. The ballast 100 also comprises a power supply 180, which receives the bus voltage $V_{BUS}$ and generates a DC supply voltage $V_{CC}$ (e.g., approximately 5 volts) for powering the control circuit 160 and other low-voltage circuitry of the ballast.

The ballast 100 may comprise a phase-control circuit 190 for receiving a phase-control voltage $V_{PC}$ (e.g., a forward or reverse phase-control signal) from a standard phase-control dimmer (not shown). The control circuit 160 is coupled to the phase-control circuit 190, such that the control circuit is operable to determine the target intensity $L_{TARGET}$ for the lamp 105 from the phase-control voltage $V_{PC}$. The ballast 100 may also comprise a communication circuit 192, which is coupled to the control circuit 160 and allows the ballast to communicate (i.e., transmit and receive digital messages) with the other control devices on a communication link (not shown), e.g., a wired communication link or a wireless communication link, such as a radio-frequency (RF) or an infrared (IR) communication link. Examples of ballasts having communication circuits are described in greater detail in commonly-assigned U.S. Pat. No. 7,489,090, issued Feb. 10, 2009, entitled ELECTRONIC BALLAST HAVING ADAPTIVE FREQUENCY SHIFTING; U.S. Pat. No. 7,528,554, issued May 5, 2009, entitled ELECTRONIC BALLAST HAVING A BOOST CONVERTER WITH AN IMPROVED RANGE OF OUTPUT POWER; and U.S. patent application Ser. No. 11/787,934, filed Apr. 18, 2007, entitled COMMUNICATION CIRCUIT FOR A DIGITAL ELECTRONIC DIMMING BALLAST, the entire disclosures of which are hereby incorporated by reference.

Alternatively, the hot terminal H of the ballast 100 could be adapted to receive the phase-control signal $V_{PC}$ rather than the full-conduction AC mains line voltage $V_{AC}$, such that the ballast is operable to both receive power and determine the target intensity $L_{TARGET}$ from the phase-control signal $V_{PC}$. An example of a load control device that receives both power and control information from a single terminal is described in greater detail in U.S. patent application Ser. No. 12/704,781, filed Feb. 12, 2010, entitled HYBRID LIGHT SOURCE, the entire disclosure of which is hereby incorporated by reference.

Figure 3:
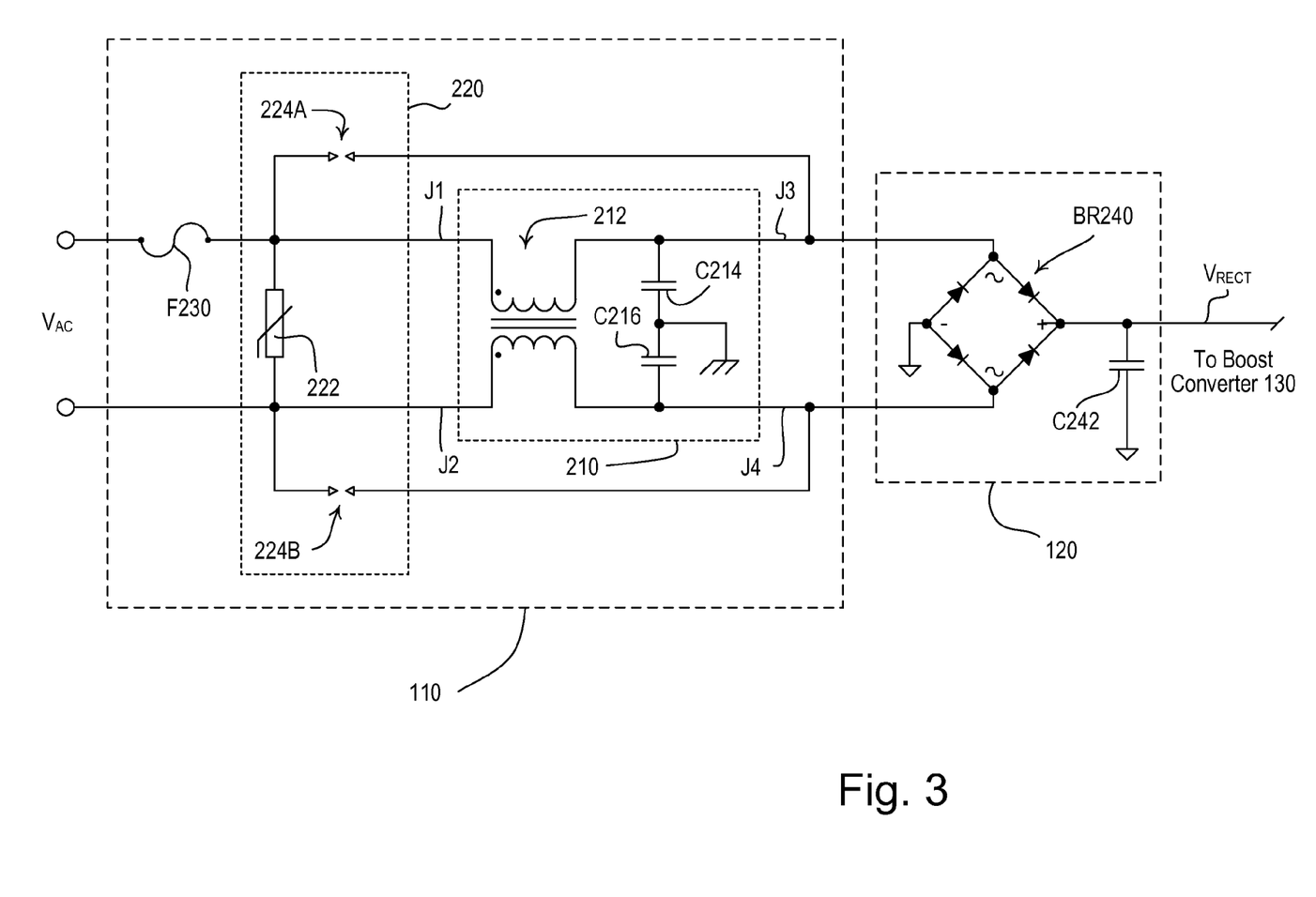
FIG. 3 is a simplified schematic diagram of an input circuit and a rectifier circuit of the ballast of FIG. 2.

FIG. 3 is a simplified schematic diagram of the input circuit 110 and the rectifier circuit 120 according to the first embodiment of the present invention. The input circuit 110 comprises a RFI (radio frequency interference) filter circuit 210 for filtering noise that may be generated by the load control circuit 140 to prevent the noise from being provided on the AC mains. The RFI filter circuit 210 has first and second connections J1, J2 adapted to receive the AC mains line voltage $V_{AC}$ from the AC power source, and third and fourth connections J3, J4 adapted to be coupled to the load control circuit 140. The input circuit 110 also comprises a surge suppression circuit 220 that operates to protect the rectifier circuit 120 and other circuitry of the ballast 100 from over-voltage conditions during a surge event, for example, if the building in which the ballast is installed is struck by lightning. The input circuit 110 further comprises a fuse F230 coupled in series with the hot terminal H. The rectifier circuit 120 comprises a full-wave rectifying diode bridge BR240 and a capacitor C242. The bridge BR240 has AC terminals coupled to the filter circuit 210, and DC terminals coupled across the capacitor C242 for generating the rectified voltage $V_{RECT}$.

According to the first embodiment of the present invention, the RFI filter circuit 210 comprises a common-mode choke 212 (e.g., a transformer) having an inductance of approximately 6.37 mH. The common-mode choke 212 has two coil windings that are magnetically connected together and are each coupled in series with one of the hot terminal H and the neutral terminal N. The common-mode choke 212 operates to prevent high-frequency common-mode currents that may be generated by the boost converter 130 or the inverter circuit 150 from being conducted to the AC power source. The RFI filter circuit 210 further comprises two capacitors C214, C216 that are coupled in series between the two coil windings of the common-mode choke 212, and both have capacitances of approximately 2200 pF. The junction of the two capacitors C214, C216 is coupled to earth ground.

The surge suppression circuit 220 is coupled to the RFI filter circuit 210 and protects the rectifier circuit 120 and other circuitry of the ballast 100 from over-voltage conditions during a surge event. During the surge event, a surge voltage, which has a very large magnitude, may be generated between the hot and neutral terminals H, N, between the hot terminal H and earth ground, or between the neutral terminal N and earth ground. The surge suppression circuit 220 includes a clamping device, e.g., a metal-oxide varistor (MOV) 222, which is electrically coupled between the hot and neutral terminals H, N. The MOV 222 operates to clamp the magnitude of the surge voltage between the hot and neutral terminals H, N of the ballast 100 (i.e., the AC mains line voltage $V_{AC}$) to a rated clamping voltage (e.g., approximately 320 VAC) when the magnitude of the AC mains line voltage $V_{AC}$ exceeds the clamping voltage of the MOV (i.e., during a surge event between the hot and neutral terminals).

As previously mentioned, surge events can cause resonant ringing in the components of the RFI filter circuit 210, which may greatly amplify the magnitude of the voltages applied to the rectifier circuit 120 and other circuitry of the ballast 100. Thus, the surge suppression circuit 220 further comprises spark gaps 224A, 224B that are coupled across the RFI filter circuit 210, specifically, in parallel with each of the coil windings of the common-mode choke 212. The first spark gap 224A comprises a first electrode coupled to the junction of the MOV 222 and the first coil winding of the common-mode choke 212, and a second electrode coupled to the junction of the capacitor C214 and the first coil winding of the common-mode choke. The second spark gap 224B comprises a first electrode coupled to the junction of the MOV 222 and the second coil winding of the common-mode choke 212, and a second electrode coupled to the junction of the capacitor C216 and the second coil winding of the common-mode choke.

Figure 4:
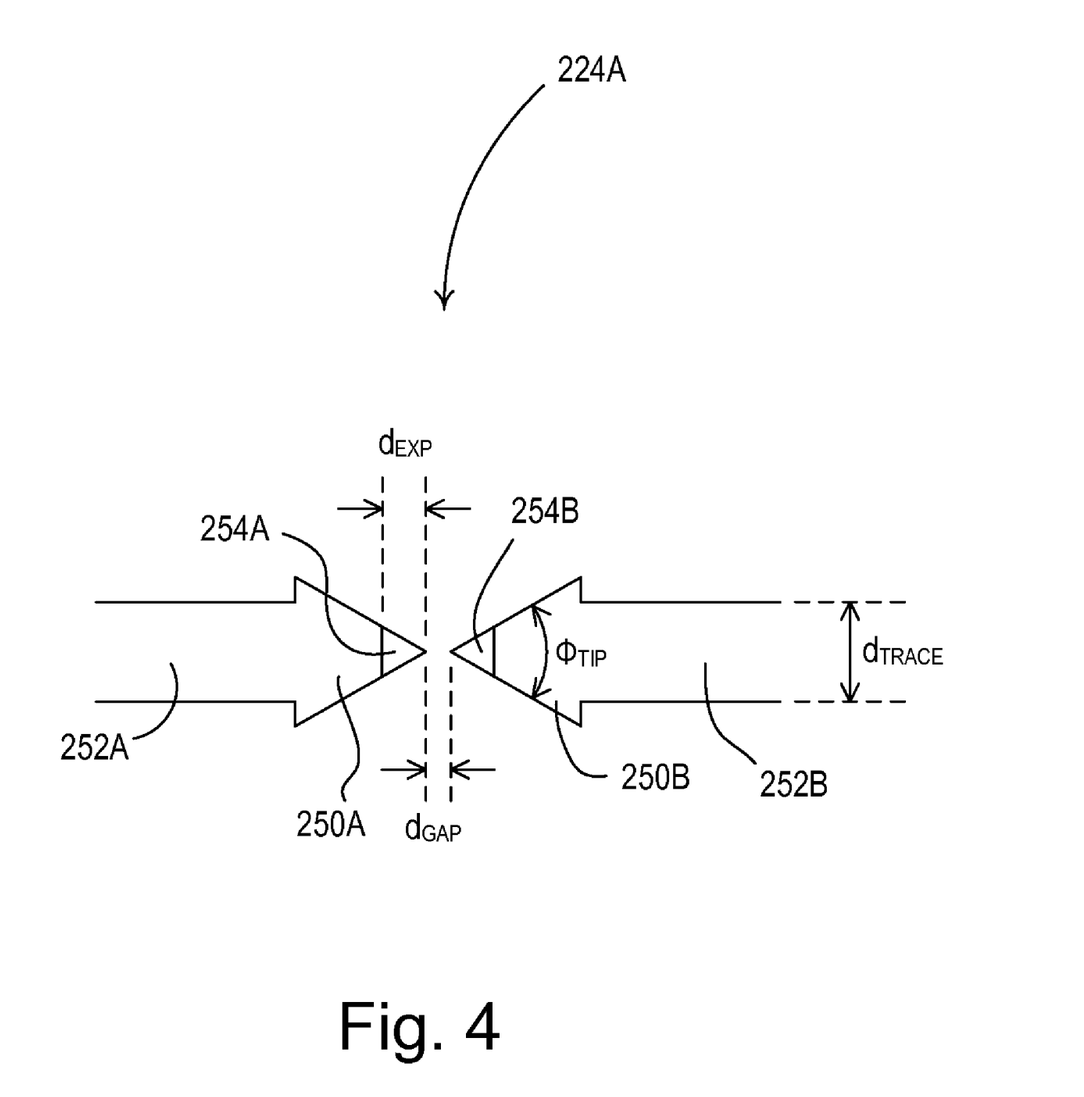
FIG. 4 is an enlarged view of a spark gap of a surge suppression system of the input circuit of FIG. 2.

FIG. 4 is an enlarged view of one of the spark gaps 224A. The first and second electrodes of the spark gap 224A each comprise a respective triangular-shaped tip 250A, 250B connected to a respective electrically conductive trace 252A, 252B. The traces 252A, 252B are electrically coupled to the respective coil windings of the common-mode choke 210. The triangular-shaped tips 250A, 250B of each electrode are characterized by a tip angle $\Phi_{TIP}$ (e.g., approximately 60°) as shown in FIG. 4. The triangular-shaped tips 250A, 250B extend towards each other and are spaced apart by a distance $d_{GAP}$. The tips 250A, 250B and the traces 252A, 252B are coated with non-conductive solder mask. Each tip 250A, 250B comprises a respective exposed portion 254A, 254B that is not coated with solder mask and may extend for a distance $d_{EXP}$ (e.g., approximately 0.040 inches). For example, the distance $d_{GAP}$ between the triangular-shaped tips 250A, 250B may be approximately 0.008-0.010 inches, such that each spark gap 224A, 224B breaks over (i.e., conducts an arc of current between the exposed portions 254A, 254B) when the voltage across the spark gap exceeds a break-over voltage (e.g., approximately 500 volts). The traces 252A, 252B may have widths $d_{TRACE}$ of, for example, greater than approximately 0.030 inches, such that each trace is sized to conduct a current of up to approximately 500 amps for approximately 50 microseconds during the surge event.

During a surge event, the magnitude of the voltages across the first and second coil windings of the common-mode choke 212 increase to the break-over voltage of the spark gaps 224A, 224B at which time the spark gaps break over, such that an arc voltage (e.g., approximately 60 volts) appears across the spark gaps. Since the MOV 222 is coupled between the first electrodes of the spark gaps 224A, 224B, the combination of the MOV and the spark gaps limit the magnitude of the differential voltage across the AC terminals of the bridge BR240 and thus the circuitry of the ballast 100. After the spark gaps 224A, 224B break over, the magnitude of the voltage across each of the capacitors C214, C216 (as referenced to earth ground) may increase to approximately the magnitude of the surge voltage. Therefore, the capacitors C214, C216 are preferably rated to withstand large voltages, and may comprise, for example, Y2-rated capacitors. Accordingly, the surge suppression circuit 220 of FIG. 3 allows the ballast 100 to easily pass hipot testing, while providing improved protection of the rectifier circuit 120 and other circuitry of the ballast during surge events.

Figure 5:
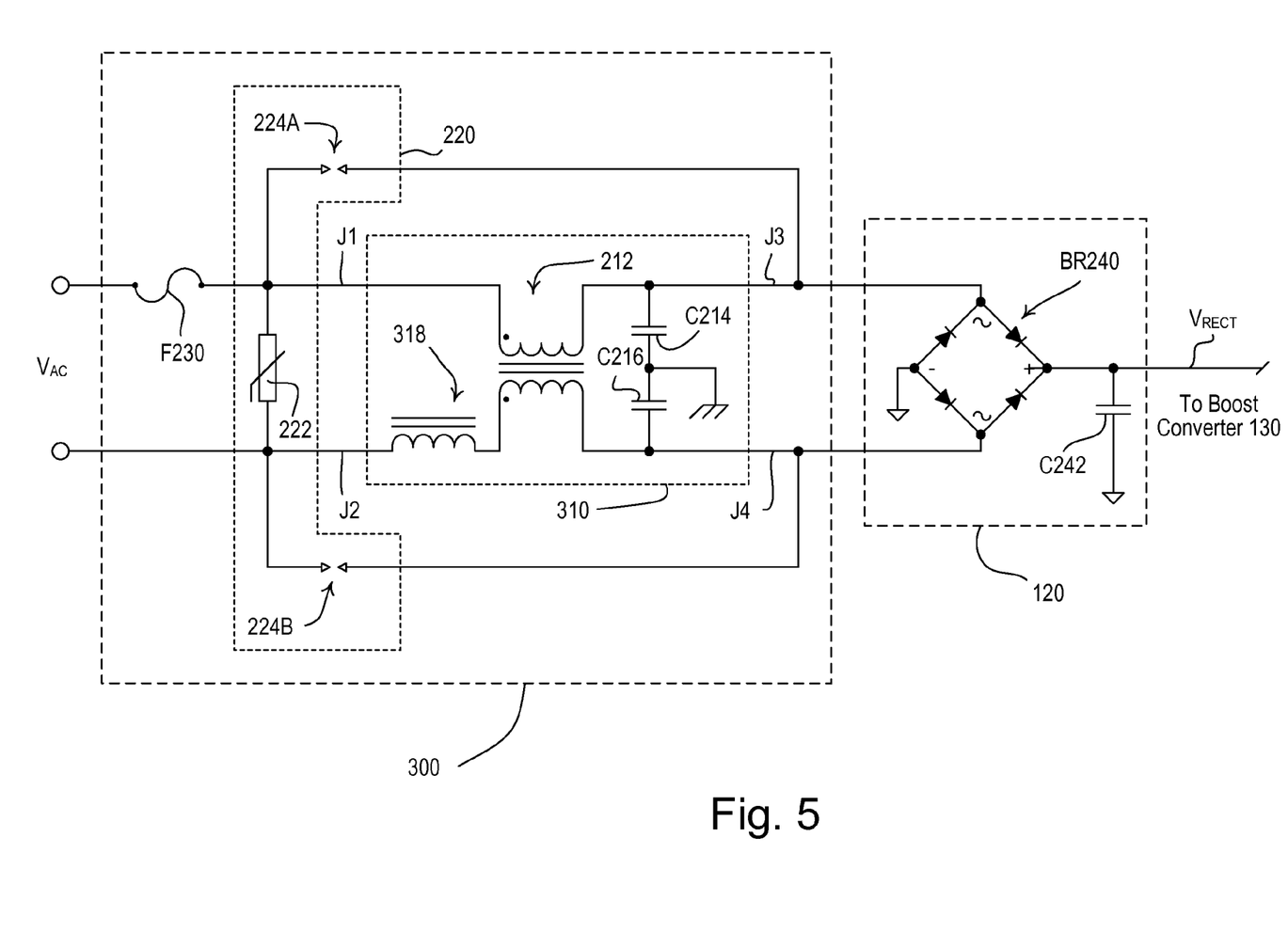
FIG. 5 is a simplified schematic diagram of an input circuit according to a second embodiment of the present invention.

FIG. 5 is a simplified schematic diagram of an input circuit 300 having an RFI filter circuit 310 according to a second embodiment of the present invention. The input circuit 300 of the second embodiment is very similar to the input circuit 110 of the first embodiment. However, the RFI filter circuit 310 of the input circuit 300 of the second embodiment also comprises a differential-mode choke 318 coupled between the MOV 222 and the first electrode of the second coil winding of the common-mode choke 212. The differential-mode choke 318 operates to filter differential-mode noise to prevent high-frequency differential-mode currents that may be generated by the ballast 100 from being conducted to the AC power source. As shown in FIG. 5, the second spark gap 224B is coupled across the series combination of the differential-mode choke 318 and the second coil winding of the common-mode choke 212, such that the spark gap breaks over when the voltage across the series combination of the differential-mode choke and the second coil winding of the common-mode choke exceeds the break-over voltage of the spark gap. Alternatively, the differential-mode choke 318 could be coupled in series with the first coil winding of the common-mode choke 212, and the first spark gap 224A could be coupled in parallel with the series combination of the differential-mode choke and the first coil winding of the common-mode choke. In addition, the differential-mode choke 318 could be coupled between the common-mode choke 212 and the capacitors C214, C216.

While the present invention has been described with reference to the ballast 100, the surge suppression circuit of the present invention may be used in other types of load control devices. For example, the surge suppression circuit could be used in a light-emitting diode (LED) driver for an LED light source, where the load control circuit 140 comprises a light-emitting diode (LED) drive circuit. Examples of LED drivers and LED drive circuits are described in commonly-assigned U.S. patent application Ser. No. 12/813,908, filed Jun. 11, 2010, entitled LOAD CONTROL DEVICE FOR A LIGHT-EMITTING DIODE LIGHT SOURCE, the entire disclosure of which is hereby incorporated by reference. In addition, the suppression system of the present invention could also be used in, for example, a dimmer switch for a lighting load, an electronic switch, a switching circuit including a relay, a controllable plug-in module adapted to be plugged into an electrical receptacle, a controllable screw-in module adapted to be screwed into the electrical socket (e.g., an Edison socket) of a lamp, a motor speed control device, or a motorized window treatment.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A surge suppression circuit for a load control device including a filter circuit and a load control circuit, the filter circuit having first and second connections adapted to receive an AC mains line voltage from an AC power source, and third and fourth connections adapted to be coupled to the load control circuit, the filter circuit operable to prevent noise generated by the load control circuit from being provided to the AC power source, the filter circuit having one or more inductive components, the surge suppression circuit comprising:
 a clamping device electrically coupled between the first and second connections of the filter circuit;
 a first spark gap coupled between the first and third connections of the filter circuit for limiting the magnitude of the voltage generated between the first and third connections by the inductive components of the filter circuit; and
 a second spark gap coupled between the second and fourth connections of the filter circuit for limiting the magnitude of the voltage generated between the second and fourth connections by the inductive components of the filter circuit.

2. The surge suppression circuit of claim 1, wherein the filter circuit comprises a common-mode choke, the first spark gap coupled in parallel with a first coil winding of the common-mode choke, the second spark gap coupled in parallel with a second coil winding of the common-mode choke.

3. The surge suppression circuit of claim 1, wherein the filter circuit comprises a common-mode choke and a differential-mode choke, the first spark gap coupled in parallel with a first coil winding of the common-mode choke, the second spark gap coupled in parallel with the series combination of the differential-mode choke and a second coil winding of the common-mode choke.

4. The surge suppression circuit of claim 1, wherein each spark gap comprises two electrodes having a distance between the electrodes of approximately 0.008-0.010 inches.

5. The surge suppression circuit of claim 1, wherein the spark gaps have a break-over voltage of approximately 500 volts.

6. The surge suppression circuit of claim 1, wherein the clamping device comprises a metal-oxide varistor.

7. A load control system for controlling the power delivered from an AC power source to an electrical load, the load control system comprising:
 a load control circuit adapted to be coupled in series electrical connection between the AC power source and the electrical load for controlling the power delivered to the electrical load;
 a filter circuit having first and second connections adapted to receive an AC mains line voltage from an AC power source, and third and fourth connections adapted to be coupled to the load control circuit, the filter circuit operable to prevent noise generated by the load control circuit from being provided to the AC power source;
 a clamping device electrically coupled between the first and second connections of the filter circuit;
 a first spark gap coupled between the first and third connections of the filter circuit for limiting the magnitude of the voltage generated between the first and third connections; and
 a second spark gap coupled between the second and fourth connections of the filter circuit for limiting the magnitude of the voltage generated between the second and fourth connections.

8. The load control system of claim 7, wherein the filter circuit comprises:
 first and second capacitors coupled in series, the series-combination of the first and second capacitors coupled between the third and fourth connections of the filter circuit, the junction of the first and second capacitors adapted to be coupled to earth ground.

9. The load control system of claim 8, wherein the filter circuit further comprises:
 a common-mode choke having first and second windings magnetically coupled together, the first winding having first and second ends coupled to the first and third connections of the filter circuit, respectively; and
 a differential-mode choke coupled in series with the second winding of the common-mode choke, the series combination of the differential-mode choke and the second winding of the common-mode choke having a first end coupled to the second connection of the filter circuit and a second end coupled to the fourth connection of the filter circuit;
 wherein the first spark gap is coupled between the first and second ends of the first winding of the common-mode choke, and the second spark gap coupled between the first and second ends of the series combination of the differential-mode choke and second winding of the common-mode choke.

10. The load control system of claim 9, wherein the differential mode choke is coupled between the clamping device and the second winding of the common-mode choke.

11. The load control system of claim 9, wherein the differential mode choke is coupled between the second winding of the common-mode choke and the series-combination of the first and second capacitors.

12. The load control system of claim 8, wherein the filter circuit further comprises:
a common-mode choke having first and second windings magnetically coupled together, the first and second windings having respective first ends coupled to the first and second connections of the filter circuit, respectively, for receiving the AC mains line voltage, the first and second windings having respective second ends opposite the first ends coupled to the third and fourth connections of the filter circuit, respectively;
wherein the first spark gap is coupled between the first and second ends of the first winding of the common-mode choke, and the second spark gap coupled between the first and second ends of the second winding of the common-mode choke.

13. The load control system of claim 7, wherein each spark gap comprises two electrodes having a distance between the electrodes of approximately 0.008-0.010 inches.

14. The load control system of claim 7, wherein the spark gaps have a break-over voltage of approximately 500 volts.

15. The load control system of claim 7, wherein the clamping device comprises a metal-oxide varistor.

16. The load control system of claim 7, wherein the electrical load comprises a gas discharge lamp and the load control circuit comprises a ballast circuit for controlling the intensity of the lamp.

17. The load control system of claim 7, wherein the electrical load comprises an LED light source and the load control circuit comprises an LED drive circuit for controlling the intensity of the LED light source.

18. The load control system of claim 7, wherein the load control system is operable to receive a full-conduction AC mains line voltage from the AC power source.

19. The load control system of claim 7, wherein the load control system is operable to receive a phase-control voltage.

20. A load control device for controlling the power delivered from an AC power source to an electrical load, the load control system comprising:
a load control circuit adapted to be coupled in series electrical connection between the AC power source and the electrical load for controlling the power delivered to the electrical load;
a common-mode choke having first and second windings magnetically coupled together, the first and second windings having respective first ends adapted to be coupled to the AC power source, the first and second windings having respective second ends opposite the first ends;
first and second capacitors coupled in series, the series-combination of the first and second capacitors electrically coupled between the second ends of the first and second windings of the common-mode choke, the junction of the first and second capacitors adapted to be coupled to earth ground;
a clamping device electrically coupled between the first ends of the first and second windings of the common-mode choke;
a first spark gap coupled between the first and second ends of the first winding of the common-mode choke; and
a second spark gap coupled between the first and second ends of the second winding of the common-mode choke.

21. The load control device of claim 20, further comprising:
a differential-mode choke coupled in series with the second winding of the common-mode choke;
wherein the second spark gap is coupled in parallel with the series combination of the differential-mode choke and the second winding of the common-mode choke.

22. The load control device of claim 21, wherein the differential-mode choke is coupled between the clamping device and the second winding of the common-mode choke.

23. The load control device of claim 21, wherein the differential-mode choke is coupled between the second winding of the common-mode choke and the series combination of the first and second capacitors.

24. The load control device of claim 20, wherein the load control device is operable to receive a full-conduction AC mains line voltage from the AC power source.

25. The load control device of claim 20, wherein the load control device is operable to receive a phase-control voltage.

26. A load control device for controlling the power delivered from an AC power source to an electrical load, the load control system comprising:
a load control circuit adapted to be coupled in series electrical connection between the AC power source and the electrical load for controlling the power delivered to the electrical load;
a common-mode choke having first and second windings magnetically coupled together, the first winding having a first end and a second end opposite the first end;
a differential-mode choke coupled in series with the second winding of the common-mode choke, the series combination of the differential-mode choke and the second winding of the common-mode choke having a first end and a second end opposite the first end, wherein the first ends of the first winding of the common-mode choke and the series combination of the differential-mode choke and the second winding of the common-mode choke are adapted to be coupled to the AC power source;
first and second capacitors coupled in series, the series-combination of the first and second capacitors coupled between the second ends of the first winding of the common-mode choke and the series combination of the differential-mode choke and the second winding of the common-mode choke, the junction of the first and second capacitors adapted to be coupled to earth ground;
a clamping device electrically coupled between the first ends of the first winding of the common-mode choke and the series combination of the differential-mode choke and the second winding of the common-mode choke;
a first spark gap coupled between the first and second ends of the first winding of the common-mode choke; and
a second spark gap coupled between the first and second ends of the series combination of the differential-mode choke and second winding of the common-mode choke.

27. The load control device of claim 26, the differential mode choke is coupled between the clamping device and the second winding of the common-mode choke.

28. The load control device of claim 26, the differential mode choke is coupled between the second winding of the common-mode choke and the series-combination of the first and second capacitors.

29. The load control device of claim 26, wherein the load control device is operable to receive a full-conduction AC mains line voltage from the AC power source.

30. The load control system of claim 26, wherein the load control device is operable to receive a phase-control voltage.

* * * * *